United States Patent
Ferenc et al.

(10) Patent No.: US 8,807,508 B2
(45) Date of Patent: Aug. 19, 2014

(54) SEAT RAISER FOR SPACING A SEAT RAIL FROM THE VEHICLE FLOOR

(75) Inventors: Anthony Ferenc, Goodrich, MI (US); Anil Bhat, Farmington Hills, MI (US)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 13/557,883

(22) Filed: Jul. 25, 2012

(65) Prior Publication Data

US 2013/0026328 A1 Jan. 31, 2013

Related U.S. Application Data

(60) Provisional application No. 61/572,997, filed on Jul. 25, 2011.

(51) Int. Cl.
*F16M 13/00* (2006.01)

(52) U.S. Cl.
USPC .................. 248/429; 296/65.13; 297/216.2

(58) Field of Classification Search
USPC .................. 248/429; 296/63, 65.11, 65.13; 297/216.2
See application file for complete search history.

(56) References Cited

U.S. PATENT DOCUMENTS

| | | | |
|---|---|---|---|
| 5,018,696 A * | 5/1991 | Siegrist ................ | 248/429 |
| 5,323,998 A | 6/1994 | Aihara | |
| 5,328,248 A | 7/1994 | Nishiyama | |
| 6,069,325 A * | 5/2000 | Aoki ................ | 177/136 |
| 6,352,312 B1 * | 3/2002 | Rees ................ | 297/470 |
| 6,752,465 B2 * | 6/2004 | Igarashi ................ | 297/452.18 |
| 7,073,764 B2 * | 7/2006 | Matsushiro ................ | 248/424 |
| 7,261,179 B2 * | 8/2007 | Mochiduki et al. ................ | 180/273 |
| 7,318,573 B2 * | 1/2008 | Yamada et al. ................ | 248/424 |
| 7,731,281 B2 * | 6/2010 | Kurita et al. ................ | 297/216.19 |
| 8,322,676 B2 * | 12/2012 | Nonomiya ................ | 248/429 |
| 2003/0168566 A1 * | 9/2003 | Ito et al. ................ | 248/429 |
| 2004/0089785 A1 * | 5/2004 | McCullen et al. ................ | 248/429 |
| 2005/0056761 A1 * | 3/2005 | Danjo et al. ................ | 248/429 |
| 2005/0109909 A1 * | 5/2005 | Osawa et al. ................ | 248/429 |
| 2007/0090262 A1 * | 4/2007 | Sung ................ | 248/429 |
| 2010/0133407 A1 * | 6/2010 | Fujieda et al. ................ | 248/429 |
| 2011/0147561 A1 * | 6/2011 | Koda et al. ................ | 248/429 |
| 2011/0272992 A1 | 11/2011 | Ferenc et al. | |

FOREIGN PATENT DOCUMENTS

| | | |
|---|---|---|
| DE | 42 24 063 A1 | 1/1993 |
| DE | 103 42 101 A1 | 4/2005 |
| DE | 10 2005 060 446 A1 | 6/2007 |
| DE | 10 2009 035 405 A1 | 2/2010 |
| EP | 0 148 472 A2 | 7/1985 |
| JP | 11-192870 A | 7/1999 |
| JP | 2004-154390 | 6/2004 |

* cited by examiner

*Primary Examiner* — Bradley Duckworth
(74) *Attorney, Agent, or Firm* — Christie, Parker & Hale, LLP

(57) ABSTRACT

A seat raiser for spacing a seat rail of a motor vehicle seat from a vehicle floor is provided. The seat raiser comprising a welding portion which includes at least one specified welding point and is formed and provided to weld the seat rail to the seat raiser at the welding point and a fastening portion which includes at least one specified fastening point and is formed and provided to fasten the seat raiser to the vehicle floor at the fastening point. The seat raiser is formed substantially L-shaped in cross-section and the welding portion and the fastening portion each form a leg of the L-shape. The welding portion includes exactly two specified welding points spaced from each other, via which the seat raiser is to be welded to the seat rail.

12 Claims, 3 Drawing Sheets

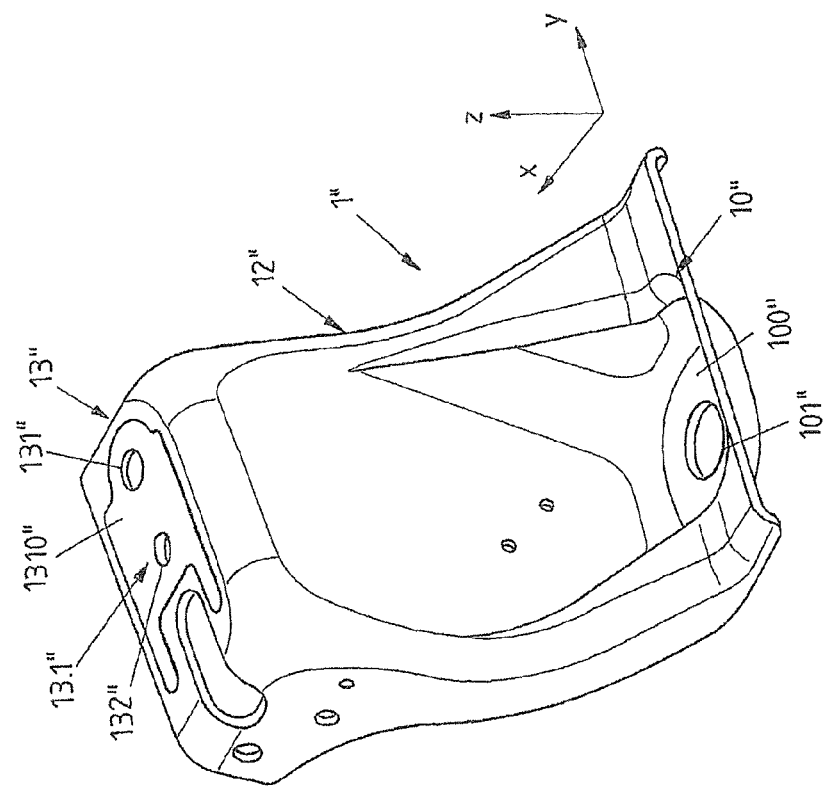
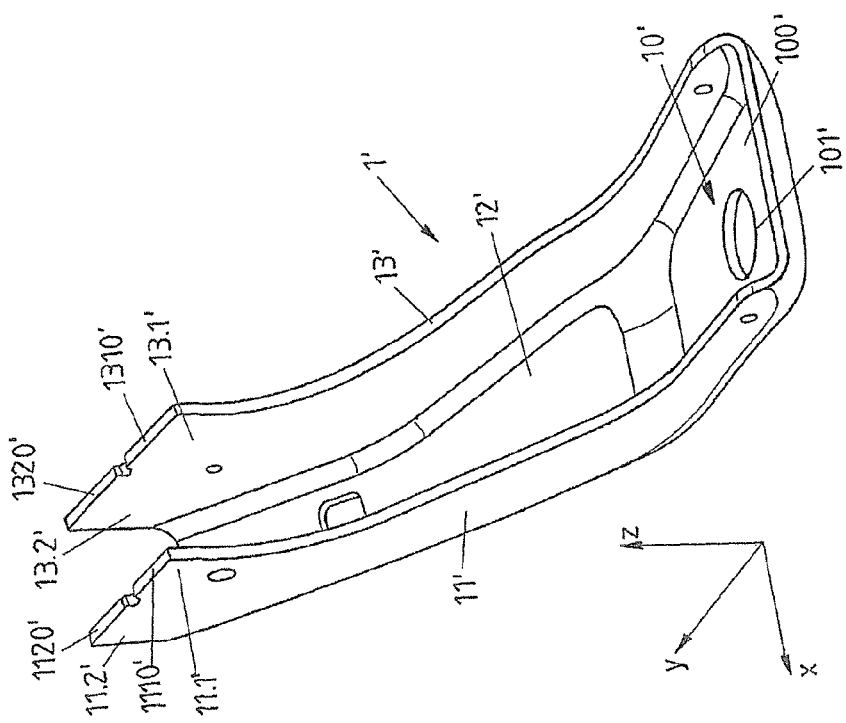

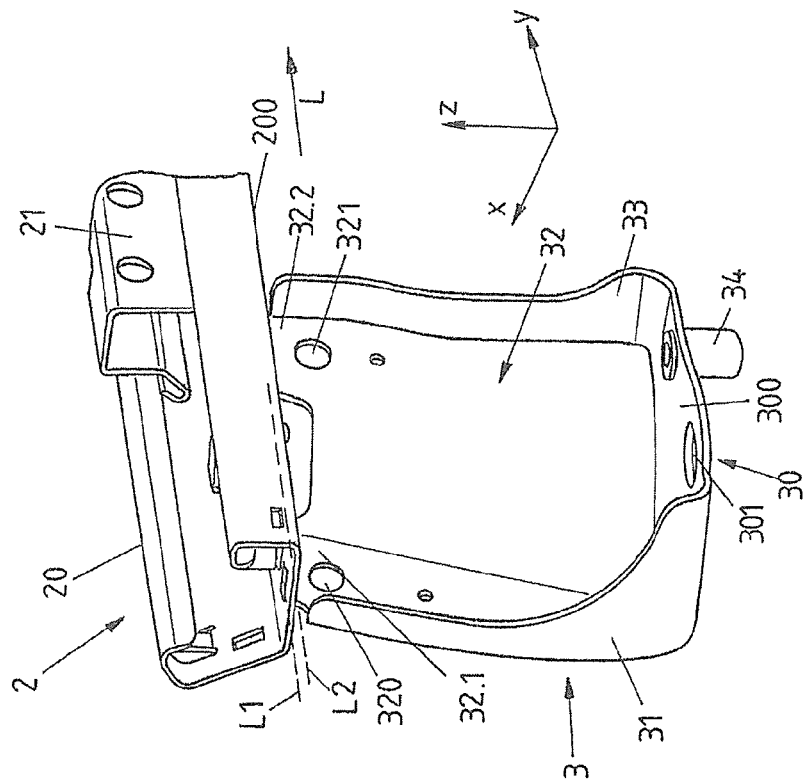
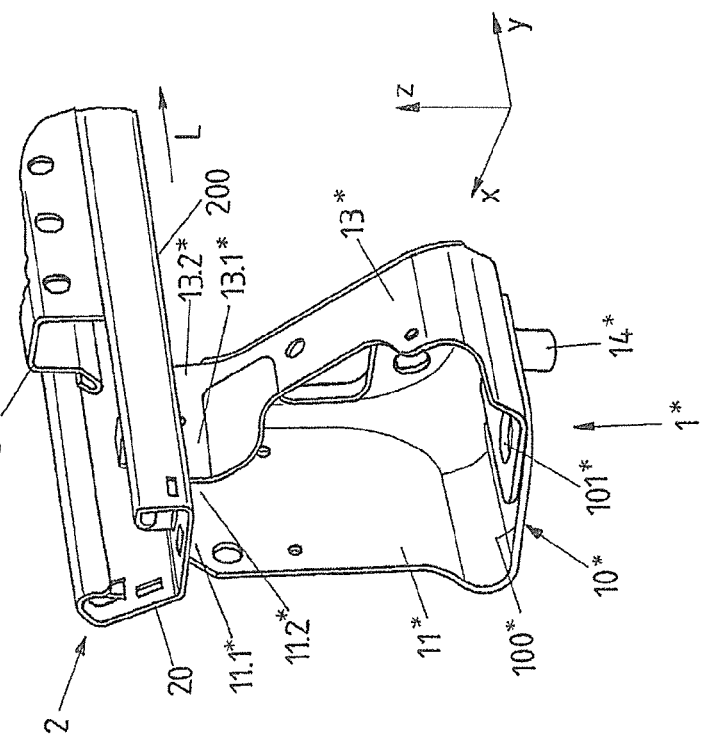

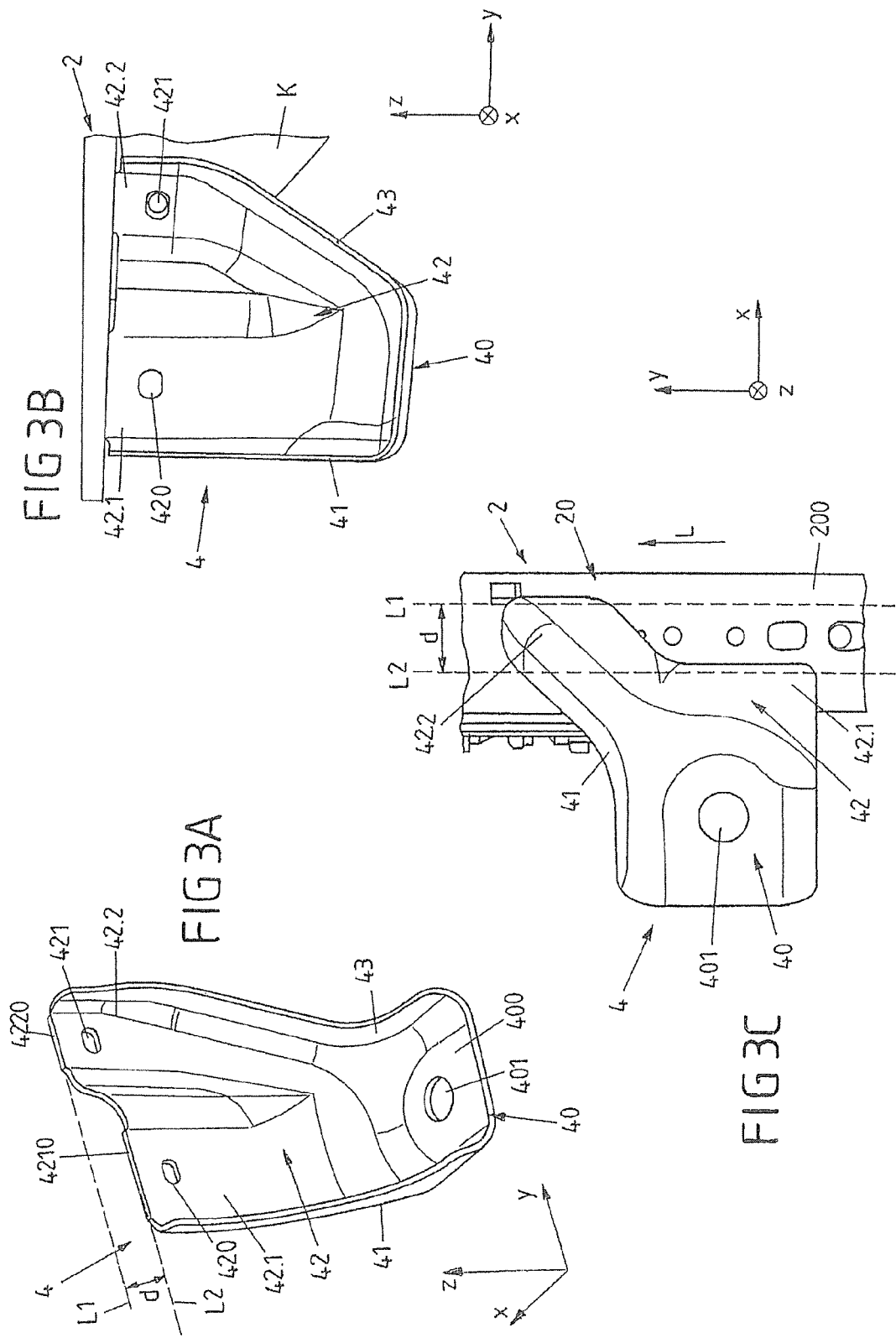

SEAT RAISER FOR SPACING A SEAT RAIL FROM THE VEHICLE FLOOR

CROSS-REFERENCE TO RELATED APPLICATION(S)

This application claims the benefit of U.S. Patent Application No. 61/572,997, filed on Jul. 25, 2011, which is fully incorporated herein by reference.

BACKGROUND

The present invention relates to a seat raiser.

With a seat raiser a seat rail provided for the longitudinal shiftability of a motor vehicle seat usually is spaced from a vehicle floor and fixed on the vehicle floor via the seat raiser. Such seat raisers usually are employed for fastening seats in larger motor vehicles, such as e.g. minibuses or transporters. Thus, a vehicle seat regularly can be completely removable and/or stowable, in order to provide additional storage space. By releasing the connection of the seat raiser with the vehicle floor, the seat then can e.g. completely be removed with the seat rail attached to the seat raiser.

A plurality of such seat raisers, usually four, usually carry the vehicle seat with a pair of seat rails, via which the vehicle seat is longitudinally shiftable, i.e. shiftable along a vehicle longitudinal axis. Via a seat raiser, a raised position of the vehicle seat typically is provided, whereby the comfort is improved for the vehicle occupant and (due to the resulting raised seating position) the field of view for a vehicle occupant sitting on the vehicle seat is enlarged.

To provide a loadable as well as quickly and easily realizable connection between the seat rail and a seat raiser, the seat rail usually is welded to a welding portion of the seat raiser at at least one welding point provided for this purpose.

For connecting the seat raiser to the vehicle floor, a fastening portion of the sea raiser in turn is provided with at least one specified fastening point. The connection to the fastening point here preferably is releasably effected via a fastening means. Such fastening means for example can be a screw or bolt, which is guided through a fastening point in the form of a through opening at the seat raiser and is turned or plugged into a fixture on the vehicle floor.

In order not to complicate the (factory) assembly of the vehicle seat on the vehicle floor or the mounting thereof by a user, just like a disassembly of the vehicle seat or its temporary removal (e.g. for providing a larger storage space), the fastening point should still be accessible relatively easily for a tool or the hand of a user.

In connection with the objective of cost and weight saving, which gains more and more priority in the automotive industry, a seat raiser furthermore should be formed as lightweight as possible. This should be achieved, however, without sacrificing the required load-carrying capacity, so that it is still possible to provide a stable connection of the vehicle seat to the vehicle floor via the seat raiser.

SUMMARY

Proceeding from these conditions, it accordingly is the object of the present invention to further improve a seat raiser and in particular design the same lighter in weight.

Such seat raiser is formed and provided for spacing a seat rail of a motor vehicle seat from a vehicle floor. For this purpose, it has a welding portion which includes at least one specified welding point and is formed and provided to weld the seat rail to the seat raiser at the welding point, and has a fastening portion which includes at least one specified fastening point and is formed and provided to fasten the seat raiser at the fastening point to the vehicle floor. The seat raiser furthermore is formed substantially L-shaped in cross-section, wherein the welding portion and the fastening portion each form a leg of the L-shape. In accordance with an exemplary embodiment of the invention it is furthermore provided that the welding portion includes exactly two specified welding points spaced from each other, via which the seat raiser is to be welded to the seat rail.

Due to the inventive formation of a seat raiser, the same furthermore is extremely loadable, but can be formed distinctly reduced as regards its dimensions. In this way, distinct weight and hence cost savings can be achieved as compared to previously known seat raisers.

The L-shape allows a support of the weight forces caused by the seat and the vehicle occupant sitting thereon (in normal use) substantially along a (vertical) main loading direction, which regularly extends along a vertical vehicle axis. Furthermore, it permits the selective introduction of these weight forces into the vehicle floor via the fastening portion extending substantially transversely to the welding portion. By providing exactly two specified welding points, the mounting effort furthermore can be reduced considerably, without having to omit a sufficient fixation at the seat rail.

The two welding points preferably are formed as longitudinally extending regions on an outer edge of the L-shaped seat raiser, at which the seat rail is to be fixed. A welding point preferably is formed on a thin-walled region of the welding portion, so that the welding point forms a narrow strip-shaped contact surface, i.e. smaller by a multiple as compared to the width of the seat rail, on which the seat rail (preferably via the bottom side of a first rail or lower rail to be fixed)—at least before welding—rests (in a planar manner) or via which the seat raiser is bluntly set onto the seat rail (or the bottom side of the lower rail to be fixed).

Preferably, the seat raiser is formed such that when properly connected with the seat rail, the welding portion extends substantially vertically and the fastening portion extending transversely thereto extends substantially horizontally, so that in cross-section the L-shaped basic shape can be seen. In particular, in this connection the seat raiser is formed such that when properly connected with the seat rail and the vehicle floor, it has this L-shape in a front or side view, without having to rotate the seat raiser (in one's mind), i.e. the base of the L rests on and is attached to the vehicle floor (in a planar manner) and the leg protruding therefrom defines the distance of the seat rail to the vehicle floor.

One exemplary design variant furthermore is characterized in that the welding portion is formed longer than the fastening portion. Via the welding portion, the distance of the seat rail from the vehicle floor is determined decisively, so that e.g. when properly mounted, the length of the substantially vertically extending welding portion specifies the distance of the seat rail from the vehicle floor and the fastening portion.

A preferred exemplary embodiment of a seat raiser according to the invention in this connection additionally is characterized in that the seat raiser is formed such that when properly welded to the longitudinally extending seat rail, it has the L-shaped cross-section in a direction of longitudinal extension of the seat rail. In other words, the welding portion which forms a (substantially vertically extending) leg of the L-shape for the most part extends in a plane parallel to the direction of longitudinal extension and also the fastening portion, which forms the other (substantially horizontally extending) leg of the L-shape, extends in a plane parallel to the direction of longitudinal extension.

For a more stable support of the seat rail by the seat raiser, the two welding points provided at the seat raiser advantageously are formed offset to each other on the welding portion. Thus, the two welding points are not located in alignment one behind or beside the other. In this way, in particular a possible tilting moment can be compensated by the seat raiser, without excessively loading the two future weldings. Even with narrow or narrow-band or strip-shaped welding points, a reliable support of weight forces and tilting moments by the seat raiser thus can be provided, which can act from the seat rail onto the seat raiser.

In an exemplary development based thereon, the two welding points are offset to each other with respect to a longitudinal axis, which extends substantially parallel to an imaginary first plane defined by the fastening portion and parallel to an imaginary second plane defined by the welding portion. The two welding points thus for example are present (in particular at least partly one beside the other or at least partly opposite each other) on the substantially vertical leg of the L-shape with a (slight) horizontal offset to each other. When properly welded to the seat rail, the two welding points thus would be offset to each other with respect to a direction of longitudinal extension of the seat rail. Thus, one welding point would be located closer to a (first) long side of the seat rail, whereas the other welding point would be located closer to a second long side opposite to the first long side.

In this connection, it is also provided in one embodiment that the two welding points are spaced from each other and arranged one behind the other with respect to a longitudinal direction. An offset of the two welding points accordingly is defined by the distance to each other transverse to this longitudinal direction. In a seat raiser connected with a seat rail, the two welding points consequently are located one behind the other and offset to each other along the direction of longitudinal extension of the seat rail.

In order to furthermore integrate additional functions by a seat raiser according to the invention, a seat raiser advantageously is also provided with at least one specified connecting point for a (further) component of the vehicle seat. For example, this can be a component different from the seat rail, which is to be fixed unmovably within the motor vehicle. In particular, such component not only can be fastened to a specified connecting point of the seat raiser, but in addition to the seat rail or its (lower) rail to be fixed stationarily.

On the basis of a seat raiser according to the invention, the provision of a vehicle seat assembly furthermore becomes possible, which includes at least one seat rail and an inventive seat raiser substantially L-shaped in cross-section. By means of the at least one seat rail, a vehicle seat can longitudinally shiftably be mounted relative to a vehicle floor. Via the seat raiser, this seat rail is spaced from the vehicle floor and the seat rail is welded to the seat raiser at two welding points specified by a welding portion of the seat raiser, which are (spatially) spaced from each other.

In a known manner, a seat rail preferably comprises a first rail or lower rail, which via at least one seat raiser or usually via a pair of seat raisers can unmovably be connected with the vehicle floor, and a second rail or upper rail longitudinally shiftable relative to this first rail or lower rail, to which a seat frame of the vehicle seat is attached.

BRIEF DESCRIPTION OF THE DRAWINGS

Moreover, further advantages and features will become apparent from the following description of exemplary embodiments with reference to the Figures:

FIGS. 1A-1C show three seat raisers known from the prior art each in a perspective representation.

FIG. 2 shows a vehicle seat assembly with a seat rail and a seat raiser according to the invention.

FIGS. 3A-3C show a further design variant of a seat raiser according to the invention in an individual representation and connected with a seat rail.

DETAILED DESCRIPTION

FIGS. 1A, 1B and 1C each show a perspective view of a seat raiser 1', 1" or 1* known from the prior art, on which a seat rail 2 each can be fixed, in particular by welding, and via which the seat rail 2 is spaced from a vehicle floor (not shown), to which the seat raiser 1', 1" or 1* is attached.

FIGS. 1A and 1B each show seat raisers which are provided for connection with a rear end of a seat rail 2, i.e. an end located in Y-direction of the vehicle tail. The seat raiser 1* of FIG. 1C, on the other hand, is provided for connection with a seat rail 2 on its opposite front end, i.e. the end located in –Y-direction of the vehicle front.

The individual seat raisers 1', 1" and 1* each include a fastening portion 10', 10" or 10*, which in the case of a proper mounting of the seat raiser 1', 1" or 1* inside the vehicle interior extends substantially parallel to the vehicle floor (horizontally) and for fixation at the vehicle floor includes a fastening point 101', 101" or 101* each in the form of a through opening.

The fastening point 101', 101", 101* each is formed on a substantially planar base surface 100', 100", 100* of the fastening portion 10', 10" or 10*, against which for example a rivet, screw or bolt head can rest as fastening means, in order to releasably connect the seat raiser 1', 1" or 1* (and hence the vehicle seat connected therewith) with the vehicle floor. For this purpose, the seat raiser 1* of FIG. 1C furthermore includes an additional fastening means 14* in the form of a protruding plug-in trunnion on the bottom side of the base surface 101* to be turned towards the vehicle floor. This plug-in trunnion 14* can be inserted into a corresponding opening in the vehicle floor, so that a proper positioning of the seat raiser 1* (and of the vehicle seat) on the vehicle floor thereby is provided, before a fixation is effected by means of a fastening means engaging in the fastening point 101*, e.g. by means of a screw.

As regards their shape, the individual seat raisers 1', 1" and 1* are designed differently. For example, the seat raiser 1' of FIG. 1A has a cross-section L-shaped in the broadest sense, wherein from the fastening portion 10' first (shorter) leg a longitudinally extending part extends at an angle as second leg. The seat raiser 1" of FIG. 1B, on the other hand, is substantially Z-shaped in cross-section, and the seat raiser 1* of FIG. 1C substantially has a convex U-shape or drop shape.

In the sea raiser 1' of FIG. 1A, two parallel side bolsters 11' and 13' extend from the fastening portion 10', which bolsters substantially extend at an angle of about 45 degrees to the base surface 100' and border the base surface 100' and an adjoining middle portion 12' each on one of two opposite sides. One side bolster 11', 13' here each forms part of a welding portion of the seat raiser 1', which is to be welded to a non-illustrated seat rail 2. As a result, a welding portion of the seat raiser 1' thus is formed by the two side bolsters 1 and 13', between which the middle portion 12' extends. The one side bolster 11' (as first part of the welding portion) and the opposite other side bolster 13' (as second part of the welding portion) furthermore each form two welding points 11.1' and 11.2' or 13.1' and 13.2' at an end of the seat raiser 1' opposite the fastening portion 10'. Welding portion of the seat raiser in principle is understood to be that portion of the seat raiser at which welding points are provided for welding to a seat rail.

The two welding points 11.1', 11.2' or 13.1' and 13.2' of a pair of welding points here are spatially separate from each other by a small notch.

Each welding point 11.1', 11.2', 13.1', 13.2' has a contact surface 1110', 1120', 1310' or 1320'. Each contact surface 1110', 1120', 1310' or 1320' extends substantially parallel to the base surface 100' and serves as supporting possibility for the seat rail 2 or a bottom side 200 of a tower rail 20 to be fixed of the seat rail 2 (cf. FIG. 1C). The seat raiser 1' of FIG. 1A thus includes a total of four welding points 11.1', 11.2', 13.1' and 13.2', at which welding of the seat rail 2 to the seat raiser 1' is effected.

A pair of welding points 11.1', 11.2' and 13.1', 13.2' of a side bolster 11' or 13' is present one behind the other in alignment with each other along a direction of longitudinal extension L of the seat rail 2, when the seat raiser 1' is properly connected with the seat rail 2. The two side bolsters 1 and 13' then furthermore are located opposite each other transversely to this direction of longitudinal extension L, so that the pair of welding points 11.1', 11.2' or 13.1', 13.2' each provided on the same is located closer to an (inner or outer) long side of the seat rail 2 than to the opposite (outer or inner) long side. The two pairs of welding points 11.1', 11.2' and 13.1', 13.2' thus are spaced from each other along an X-direction, which extends transversely to a direction of longitudinal extension L of the seat rail 2 connected therewith.

In this seat raiser F known from the prior art, the welding portion 11', 13' hence for the most part extends in a plane which is vertical or inclined to the direction of longitudinal extension, and the fastening portion 10' extends in a plane which is parallel to the direction of longitudinal extension of the seat rail 2.

Beside the lower rail 20 to be connected with the seat raiser 1', 1" or 1*, a seat rail 2 as shown in FIGS. 1C, 2, 3B and 3C each includes a second rail or upper rail 21 longitudinally shiftably mounted relative to the first rail or lower rail 20. With this shiftably mounted upper rail 21, a seat frame of the vehicle seat usually is connected, so that the vehicle seat is adjustable along a longitudinal vehicle axis (here then in –Y- and Y-direction) via the seat rail 2 and its two rails 20, 21.

In the seat raiser 1" of FIG. 1B, the fastening portion 10" in turn is followed by a substantially vertically extending middle portion 12", which opens into a welding portion 13" extending substantially parallel to the fastening portion 10", so that the Z-shape of the seat raiser 1" as seen in cross-section is obtained.

Accordingly, the welding portion 13" forms a larger welding point 13.1" (as compared to the welding points 11.1', 11.2', 13.1 and 13.2' of the seat raiser 1' of FIG. 1A) for welding to the seat rail 2. Here, a contact surface 1310" is provided, which occupies most of an (upper) side defined by the welding portion 13", which faces the seat rail 2 when then same is properly connected with the seat raiser 1".

The bottom side 200 of a first rail or lower rail 20 to be fixed of the seat rail 2 accordingly can lie flat on the contact surface 1310" of the welding portion 13.1" with a major part of its width, before welding is performed along the circumference of the contact surface 1310". On the other hand, it can of course also be provided that the seat raiser 1" is set onto the bottom side 200 of the lower rail 20 and welded to the same.

For additionally fixing the seat raiser 1" to the seat rail 2 or its lower rail 20, additional fastening points 131" and 132" furthermore are provided on the welding portion 13" in the form of through openings or bores. These fastening points 131" and 132" are located within the contact surface 1310" of the welding point 13.1".

The seat raiser 1* of FIG. 1C shows a further shape already known from the prior art, in order to space a seat rail 2 from a vehicle floor along a vertical vehicle axis (in Z-direction). The seat raiser 1* here includes two opposed side bolsters 11* and 13*, which in the case of a proper connection of the seat raiser 1* with the seat rail 2 extend as thin-walled parts of a welding portion from the base surface 100* in direction of the seat rail 2. The two side bolsters 11* and 13* each form a border of the base surface 100*. Furthermore, in a side view (view along the direction of longitudinal extension L of the seat rail 2) they define a substantially convex U-shape or drop shape of the seat raiser 1*. In particular one of the side bolsters 11*, 13*, which each form a leg of the U-shape, extends at angle to the other side bolster 11*, so that in the region of the connection with the seat rail 2 the seat raiser it* has a smaller width than in the region of the fastening portion 10*. Accordingly, the seat raiser 1* is formed such that it broadens proceeding from the seat rail 2 in direction towards the vehicle floor and appears convex. In particular, this serves for the improved introduction of forces into the vehicle floor via the seat raiser 1*, which forces act on the seat raiser 1* via the vehicle seat and the seat rail 2. Especially with this shape, a seat raiser 1* however is comparatively heavy.

For fixing the seat rail 2 to the seat raiser 1*, it is also provided here to weld its lower rail 20 to be locked unmovably via its bottom side 200 to the seat raiser 1*. For this purpose, the individual side bolsters 11* and 13* likewise each form a pair of welding points 11.1*, 11.2* or 13.1* and 13.2* aligned with each other. The seat raiser 1* accordingly again includes a total of four welding points 11.1*, 11.2*, 13.1* and 13.2*, which are located opposite each other in pairs transversely to a direction of longitudinal extension L of the seat rail 2 (in X-direction), when the seat raiser 1* is properly connected with the seat rail 2 corresponding to FIG. 1C.

The seat raisers 1', 1" and 1* already known from FIGS. 1A to 1C on the one hand have the disadvantage that several and/or larger welding points are provided on a welding portion of the seat raiser 1', 1" or 1*, so that a connection with a seat rail 2 is comparatively expensive. Furthermore, there always is a need for components optimized more in terms of costs and weight.

The two design variants of a seat raiser 3, 4 according to the invention as shown in FIGS. 2 and 3A-3C take account of these requirements. They are both substantially L-shaped in cross-section and merely have two welding points 32.1, 32.2 or 42.1, 42.2 for connection with a seat rail 2. Both seat raisers 3 and 4 preferably are made of a metal with a comparatively thin wall. The seat raiser of FIG. 2 is provided for connection with a seat rail 2 in a front region of the seat rail 2, whereas the seat raiser 4 of FIGS. 3A to 3C is provided for connection at a rear region of one and the same seat rail 2.

The seat raiser 3 of FIG. 2 includes a fastening portion 30 which forms a (shorter) leg of the L-shape, as well as a welding portion 32 extending substantially vertically away from the same, which forms the wider (longer) leg of the L-shape.

Here as well, the fastening portion 30 has a substantially planar base surface 300, on which a fastening point 301 is formed in the form of a through opening or bore for fixing the seat raiser 3 on a vehicle floor. Furthermore, an additional fastening means 34 in the form of a plug-in trunnion is provided at the fastening portion 30. In the present case, this plug-in trunnion 34 is molded to the fastening portion 30 or molded together with the same and protrudes from its bottom side.

Similar to the seat raiser 1 of FIG. 1A, the seat raiser 3 includes two opposed side bolsters 31 and 33, which in the further course substantially vertically extend away from the base surface 300 and together with a welding portion 32 adjoining the base surface 300 enclose the same from three sides. In contrast to the seat raiser 1' of FIG. 1A, the side bolsters 31 and 33 of the seat raiser 3 on the one hand do not form any welding points. On the other hand, when properly connected with the seat rail 2, they are not located opposite each other transversely to a direction of longitudinal extension L of the seat rail 2, but in direction of the direction of longitudinal extension L. Accordingly, the fastening portion 30 with the base surface 300 does not extend away from the welding portion 32 parallel to the direction of longitudinal extension L of the seat rail 2 (in direction), but (in −X-direction) transversely to this direction of longitudinal extension L, in order to define the L-shape of the seat raiser 3.

The welding portion 32 constructed broader by a multiple as compared the side bolsters 31 and 33 has two welding points 32.1 and 32.2 protruding in direction of the seat rail 2. These welding points 32.1 and 32.2 are formed like tabs and spatially spaced from each other via a cutout A.

The cutout A defines a distance of the two welding points 32.1 and 32.2 (like the welding points 42.1 and 42.2 of the seat raiser 4 of FIGS. 3A to 3C) from each other, which lies in the same order of magnitude as the length of a contact surface of a welding point 32.1 or 32.2, along which the seat rail 2 (in direction of longitudinal extension L) is connected with a welding point 32.1 or 32.2.

The two welding points 32.1 and 32.2 furthermore are formed at the welding portion 32 offset to each other. Accordingly, the two welding points 32.1 and 32.2 are offset to each other with respect to a longitudinal axis L1 or L2, which extends substantially both parallel to an imaginary first plane defined by the fastening portion 30 and parallel to an imaginary second plane defined by the welding portion 32. Such longitudinal axis L1 or L2, which is shown in FIG. 2, hence extends substantially parallel to a direction of longitudinal extension L of the seat rail 2.

With respect to this longitudinal axis L1 or L2 or also with respect to a longitudinal vehicle direction Y (or −Y), the two welding points 32.1 and 32.2 furthermore are spaced from each other and arranged one behind the other. Due to the offset between the two welding points 32.1 and 32.2, their narrow strip-shaped contact surfaces hence extend along two longitudinal axes L1 and L2 parallel to each other.

In a vehicle seat assembly with a rail 2 and the seat raiser 3 it is thus achieved that the one welding point 32.1 for example is located closer to an outer (facing away from the interior of the seat) long side of the seat rail 2 and the other welding point 32.2 is located closer to the opposite, inner long side of the seat rail 2. Accordingly, the seat raiser 3 also can compensate possible tilting moments which result from a rotation or torsion of the seat rail 2 about its longitudinal axis. Due to the offset arrangement of the two welding points 32.1 and 32.2 and the L-shaped configuration of the seat raiser 3, the same consequently can be formed distinctly more compact and hence lighter in weight than a seat raiser 1', 1" or 1* of the preceding Figures, without substantially compromising on its load-bearing capacity. By providing merely two welding points 32.1 and 32.2, the connection with the seat rail 2 furthermore is considerably simplified, since therefore less welding points are specified.

To furthermore integrate additional functions in the seat raiser 3 shown in FIG. 2, the seat raiser 3 here is provided with two connecting points 320 and 321 formed as through openings for a (further) component of the vehicle seat. For example, this can be a component different from the seat rail 2, which is to be fixed unmovably (or shiftably) within the motor vehicle. Such component in particular can be attached not only to a specified connecting point of the seat raiser, but in addition to the seat rail 2 or its (lower) rail 20 to be fixed stationarily.

In the present case, one connecting point 320 or 321 each is provided in the region of one of the two welding points 32.1, 32.2 and hence at a distance to the fastening portion 30 which is greater by a multiple than the distance to a seat rail 2 or (lower) rail 20 of the seat rail 2 properly welded to the seat raiser 3.

FIGS. 3A to 3C illustrate various views of a further possible configuration alternative for a seat raiser 4 according to the invention. This seat raiser 4 preferably is provided for spacing a seat rail 2 at its rear end located in direction Y of the vehicle tail.

Here as well, the seat raiser 4 is substantially L-shaped, wherein the L-shape is defined by a welding portion 40 and a welding portion 42 extending substantially vertically thereto. Here as well the fastening portion 40 includes abuse surface 400 with a fastening point 401 formed as through bore, which serves the fixation of the seat raiser 4 on a vehicle floor. The welding portion 42, which here is also framed or bordered by two side bolsters 41 and 43, on the one hand specifies the distance of the seat rail 2 from the fastening portion 40 and the vehicle floor via its length. On the other hand, the welding portion 42 here also forms two welding points 42.1 and 42.2 spatially spaced from each other and protruding in the manner of tabs in direction of a seat rail 2. At these welding points 42.1 and 42.2 a welding with the seat rail 2 or its lower rail 20 is provided at the bottom side 200 of the lower rail 20.

A contact surface 4210, 4220 formed by one welding point 42.1, 42.2 each also is formed here comparatively narrow and strip-shaped. It each extends along a longitudinal axis L1 (in the case of the contact surface 4220 of the welding point 42.2) or along a longitudinal axis L2 (in the case of the contact surface 4201 of the other welding point 42.1). The two welding points 42.1 and 42.2 are formed offset to each other, so that they have an offset d to each other.

This offset d here corresponds to the distance of the parallel longitudinal axes L1 and L2, which in the case of a proper connection of the seat raiser 4 with the seat rail 2 extend parallel to the direction of longitudinal extension L of the seat rail 2. In the present case, this is shown particularly clearly in FIG. 3B, in which the vehicle seat assembly of seat raiser 4 and seat rail 2 is shown in a view from below, i.e. as seen from the vehicle floor. This Figure in particular reveals that the one welding point 42.2 is located closer to a (right) long side of the seat rail 2, whereas the other welding point 42.1 is located closer to the other (left) long side of the seat rail 2 or has a smaller distance to the same.

As can furthermore be taken in particular from the side view of FIG. 3C, the seat raiser 4 broadens proceeding from the fastening portion 40, as a foot or base of the seat raiser 4, along one (Z-direction) of its two main directions of extension (X-direction and Z-direction) towards the seat rail 2. The width of the seat raiser 4 in the region of the welding points 42.1 and 42.2 (along the direction of extension Y) accordingly is greater than the width of the fastening portion 40 by about a factor of 1.5. In the seat raiser 3 of FIG. 2 by contrast said widths are substantially identical to each other.

To furthermore integrate additional functions in the seat raiser 4 shown in FIGS. 3A to 3C, the seat raiser 4 here is also provided with two connecting points 420 and 421 formed as through openings for a (further) component of the vehicle seat, which here is partly shown as a seat component K. This is a component of the vehicle seat different from the seat rail 2, which is unmovably (or possibly shiftably) fixed on the seat raiser 4. For this purpose, the seat component K here positively engages in one of the two connecting points 420, 421 with a protruding fastening pin. The seat component K not only is fixed at the specified connecting point 421 of the seat raiser 4, but in addition e.g. also at the stationary tower rail 20 unmovably mounted relative to the seat raiser 4.

In one design variant of a vehicle seat assembly, two identical seat raisers 3 or 4 or the two differently designed seat raisers 3 and 4 as shown in FIG. 2 and FIGS. 3A to 3C are provided on a common seat rail 2, in order to arrange the same in a raised position with respect to the vehicle floor on two regions spaced from each other along the direction of longitudinal extension L of the seat rail 2. The two seat raisers each are equipped with two welding points 32.1, 32.2 or 42.1, 42.2 offset to each other, so that the seat rail 2 is supported on a total of (at least) four points. The two seat raisers 3, 4 preferably are formed and arranged on the seat rail 2 such that one welding point 32.1, 32.2, 42.1, 42.2 each of the one seat raiser 3, 4 extends along the same longitudinal axis L2 (L1) as the welding point 32.1, 32.2, 41.1 or 42.2 of the other seat raiser 3 or 4.

Thus, for example two identical seat raisers 3 or 4 or two different seat raisers 3 and 4 can be welded to a seat rail 2. There is preferred a vehicle seat assembly in which the offset d between a pair of welding points 32.1, 32.2 or 42.1, 42.2 of a seat raiser 3 or 4 each is identical to the offset d between the other pair of welding points 32.1, 32.2 or 42.1, 42.2 of the other seat raiser 3 or 4. In this way, two welding points each extend along a common longitudinal axis L1 or L2.

When combining a seat rail 2 with a seat raiser 3 of FIG. 2 and a seat raiser 4 of FIGS. 3A to 3C, the welding points 32.1 and 42.2 then would lie on the common longitudinal axis L2 and the two welding points 32.2 and 42.1 would lie along the longitudinal axis L1 parallel thereto and spaced by the offset d. Consequently, one welding point 32.1 (32.2) each of the one seat raiser 3 and one welding point 42.2 (42.1) each of the other seat raiser 4 here extend along the same longitudinal axis L1 (L2) (parallel to the direction of longitudinal extension L of the seat rail 2). In this way, a support of the seat rail 2 (or its lower rail 20) welded to the two seat raisers 3, 4 can be provided by merely two seat raisers 3, 4, in which a support of the seat rail 2 is effected twice in a region (each in the vicinity of one of the two end faces of the seat rail 2) which is located closer to a first (outer) long side of the seat rail 2 and at the same time twice in a region which is located closer to another second (inner) long side of the seat rail 2.

The invention claimed is:

1. A seat raiser for spacing a seat rail of a motor vehicle seat from a vehicle floor comprising:
   a welding portion which includes exactly two specified welding points and is configured to accommodate by a weld a bottom side of the seat rail at the welding point, and
   a fastening portion which includes at least one specified fastening point and is formed and provided to fasten the seat raiser at the fastening point to the vehicle floor,
   wherein the seat raiser is formed substantially L-shaped in cross-section and the welding portion forms a first leg of the L-shape and the fastening portion forms a second leg of the L-shape, and
   wherein the exactly two specified welding points are spaced from each other and via which the seat raiser is welded to the bottom side of the seat rail.

2. The seat raiser according to claim 1, wherein when the seat raiser is connected with the seat rail, the welding portion extends substantially vertically and the fastening portion extending transversely thereto and extends substantially horizontally.

3. The seat raiser according to claim 1, wherein the welding portion is longer than the fastening portion.

4. The seat raiser according to claim 1, wherein the two welding points are offset with respect to each other.

5. The seat raiser according to claim 4, wherein the two welding points are offset to each other with respect to a longitudinal axis which extends substantially parallel to an imaginary first plane defined by the fastening portion and parallel to an imaginary second plane defined by the welding portion.

6. The seat raiser according to claim 1, wherein the two welding points are arranged spaced from each other and one behind the other with respect to a longitudinal direction along which the seat rail extends when the seat raiser is welded to the seat rail.

7. The seat raiser according to claim 6, wherein the welding points furthermore are spaced from each other transversely to the longitudinal direction and thereby are formed on the welding portion offset to each other.

8. The seat raiser according to claim 1, wherein the welding portion comprises at least one more specified connecting point for a component of the vehicle seat.

9. A vehicle seat assembly with at least one seat rail by which a vehicle seat can longitudinally shiftably be mounted relative to a vehicle floor, and comprising at least one seat raiser according to claim 1, via which the seat rail is spaced from the vehicle floor and to which the seat rail is welded on the two welding points of the seat raiser.

10. The vehicle seat assembly according to claim 9, wherein the two welding points of the seat raiser, at which the seat rail is welded to the seat raiser, are arranged one behind the other in a direction of longitudinal extension of the seat rail.

11. The vehicle seat assembly according to claim 9, wherein the two welding points of the seat raiser, at which the seat rail is welded to the seat raiser, are offset to each other with respect to a direction of longitudinal extension of the seat rail.

12. The vehicle seat assembly according to claim 9, wherein the fastening portion extends substantially transversely to a direction of longitudinal extension of the seat rail.

* * * * *